(12) United States Patent
Kuk et al.

(10) Patent No.: US 11,635,283 B2
(45) Date of Patent: Apr. 25, 2023

(54) BLASTING SYSTEM AND OPERATING METHOD THEREOF

(71) Applicant: HANWHA CORPORATION, Seoul (KR)

(72) Inventors: Yong Seok Kuk, Boeun-gun (KR); Tae Seob Shin, Boeun-gun (KR)

(73) Assignee: HANWHA CORPORATION, Seoul (KR)

( * ) Notice: Subject to any disclaimer, the term of this patent is extended or adjusted under 35 U.S.C. 154(b) by 433 days.

(21) Appl. No.: 16/627,488

(22) PCT Filed: Dec. 16, 2019

(86) PCT No.: PCT/KR2019/017767
§ 371 (c)(1),
(2) Date: Dec. 30, 2019

(87) PCT Pub. No.: WO2020/153606
PCT Pub. Date: Jul. 30, 2020

(65) Prior Publication Data
US 2021/0333077 A1 Oct. 28, 2021

(30) Foreign Application Priority Data

Jan. 24, 2019 (KR) ........................ 10-2019-0009140

(51) Int. Cl.
*F42D 1/055* (2006.01)
*H04W 56/00* (2009.01)
*H04W 84/18* (2009.01)

(52) U.S. Cl.
CPC ............ *F42D 1/055* (2013.01); *H04W 56/00* (2013.01); *H04W 84/18* (2013.01)

(58) Field of Classification Search
CPC . F42D 1/045; F42D 1/05; F42D 1/055; F42D 1/06; F42D 63/04; H04W 56/00; H04W 56/001; H04W 84/18
USPC ........................................................ 102/206
See application file for complete search history.

(56) References Cited

U.S. PATENT DOCUMENTS

| | | | |
|---|---|---|---|
| 7,370,583 B2 | 5/2008 | Hallin et al. | |
| 7,493,859 B2* | 2/2009 | Russell | ..................... F42D 1/05 |
| | | | 102/200 |
| 7,568,429 B2* | 8/2009 | Hummel | ................. F42D 1/055 |
| | | | 102/206 |
| 7,848,078 B2* | 12/2010 | Hummel | ................... F42D 3/04 |
| | | | 361/247 |

(Continued)

FOREIGN PATENT DOCUMENTS

| | | |
|---|---|---|
| JP | 2005-520115 A | 7/2005 |
| KR | 10-0665878 B1 | 1/2007 |

(Continued)

*Primary Examiner* — Joshua E Freeman
*Assistant Examiner* — Benjamin S Gomberg
(74) *Attorney, Agent, or Firm* — WHDA, LLP

(57) ABSTRACT

Provided is a method of operating a blasting system. A blasting device is synchronized with a detonator. A unit group including a plurality of the detonators is set. A first detonator is set from among the plurality of detonators of the unit group. A wireless network based on the first detonator is set. The blasting device performs communications with the plurality of detonators of the unit group via the first detonator.

9 Claims, 11 Drawing Sheets

(56) References Cited

U.S. PATENT DOCUMENTS

| | | | |
|---|---|---|---|
| 7,929,270 B2* | 4/2011 | Hummel | F42D 3/04 361/249 |
| 8,861,172 B2* | 10/2014 | Hummel | F42D 1/045 361/247 |
| 9,377,280 B2* | 6/2016 | Schlenter | F42D 1/02 |
| 9,450,684 B2* | 9/2016 | Roper | F42D 3/04 |
| 10,113,843 B2* | 10/2018 | Appleby | F42B 3/113 |
| 10,295,323 B2* | 5/2019 | Kotsonis | F42D 1/05 |
| 11,486,686 B2* | 11/2022 | Hwang | F42D 3/04 |
| 2008/0282925 A1* | 11/2008 | Lownds | F42D 3/04 702/14 |
| 2009/0193993 A1 | 8/2009 | Hummel et al. | |
| 2015/0101503 A1* | 4/2015 | Brown | F42D 1/05 102/206 |
| 2021/0318107 A1* | 10/2021 | Maurissens | F42D 3/04 |
| 2022/0290961 A1* | 9/2022 | Maurissens | F42D 3/04 |
| 2022/0349693 A1* | 11/2022 | Nielsen | H04B 13/02 |

FOREIGN PATENT DOCUMENTS

| | | |
|---|---|---|
| KR | 10-0665880 B1 | 1/2007 |
| KR | 10-0733346 B1 | 6/2007 |
| KR | 10-1016538 B1 | 2/2011 |
| KR | 10-2014-0032764 A | 3/2014 |
| KR | 10-2016-0148543 A | 12/2016 |
| WO | 2006/076777 A1 | 7/2006 |
| WO | 2020/037337 A1 | 2/2020 |

\* cited by examiner

| Connection value | x=-1 | x=0 | x=1 |
|---|---|---|---|
| y=1 | 1 | 1 | 1 |
| y=0 | 1 | 8 | 1 |
| y=-1 | 1 | 1 | 1 |

| Reference value | x=-1 | x=0 | x=1 |
|---|---|---|---|
| y=1 | 3 | 3 | 3 |
| y=0 | 3 | 4 | 3 |
| y=-1 | 3 | 3 | 3 |

FIG. 12

BLASTING SYSTEM AND OPERATING METHOD THEREOF

TECHNICAL FIELD

The present invention relates to a blasting system and an operating method thereof and, more particularly, to a blasting system and an operating method thereof using a wireless low-power communication network.

BACKGROUND ART

In general, explosives are used in engineering work, such as in rock blasting and in the demolition of buildings. That is, a plurality of holes, into which explosives are to be inserted, is drilled to correspond to the sections of a blasting target, i.e. the object to be blasted. After an explosive is inserted into each of the drilled holes, the explosives are connected to a blasting system. The explosives are ignited by operating the blasting system, thereby exploding the blasting target.

Such a blasting system includes a detonator serving as an igniter to ignite an explosive and a blasting device providing power necessary for the actuation of the detonator and a command signal to the detonator. Here, the detonator of the blasting system is generally implemented as an electric detonator. The electric detonator is disposed on an explosive side, and a plurality of electric detonators is connected to a single blasting device.

Such electric detonators may have a structure in which a plurality of detonators connected to a blasting device is simultaneously activated to simultaneously detonate explosives, or a structure in which a plurality of detonators connected to a blasting device is set to have different delay times to be sequentially activated to thus sequentially detonate explosives.

Although electric detonators simultaneously detonating a plurality of explosives have been used to date, electric detonators sequentially detonating a plurality of explosives are more commonly used at present. For example, blasting systems using such an electric detonator are disclosed in a plurality of documents, such as Korean Patent No. 10-1016538, Korean Patent No. 10-0665878, Korean Patent No. 10-0665880, Korean Patent No. 10-0733346, and Japanese Patent Application Publication No. 2005-520115.

DISCLOSURE

Technical Problem

Accordingly, the present invention has been made keeping in mind the above problems occurring in the prior art, and an objective of the present invention is to provide a blasting system and an operating method thereof able to reduce communication load on the blasting device in wireless communication between the blasting device and the detonator.

Another objective of the present invention is to provide a blasting system and an operating method thereof able to perform routing according to the detonators by setting a wireless network among the detonators.

Technical Solution

In order to accomplish the above objective, a method of operating a blasting system according to embodiments the present invention may include: synchronizing a blasting device with a detonator; setting a unit group including a plurality of the detonators; setting a first detonator among the plurality of detonators of the unit group; setting a wireless network on the basis of the first detonator; and performing, by the blasting device, communications with the plurality of detonators of the unit group via the first detonator.

The synchronization may synchronize an absolute time of the blasting device and an absolute time of the detonator.

The setting of the first detonator may set a detonator among the plurality of detonators of the unit group, located in a center, as the first detonator.

The setting of the first detonator may set a detonator among the plurality of detonators of the unit group, located closest to the blasting device, as the first detonator.

The setting of the wireless network may include: setting the wireless network by connecting the first detonator to detonators among the plurality of detonators, located adjacently to the first detonator; generating connection values for the plurality of detonators on the basis of the wireless network; comparing the connection values and reference values for the plurality of detonators; and when the connection value for a single detonator among the plurality of detonators is greater than the reference value for the single detonator among the plurality of detonators, resetting the wireless network.

The reference values may be previously set on the basis of performance of the plurality of detonators.

The blasting device may store the reference values in a blasting memory of the blasting device.

A blasting system according to embodiments of the present invention may include: a detonator disposed in a blasting hold of a blasting target; and a blasting device transmitting a blasting command to the detonator via a wireless network, wherein the blasting device includes: a synchronization module performing synchronization with the detonator; a unit group setting module setting a unit group including a plurality of the detonators; a first detonator setting module setting a first detonator among the plurality of detonators of the unit group; and a network setting module setting the wireless network on the basis of the first network.

The blasting device may include a blasting communication part performing communications with the plurality of detonators of the unit group via the first detonator.

The synchronization module may synchronize an absolute time of the blasting device and an absolute time of each detonator among the plurality of detonators.

The network setting module may set the wireless network by connecting the first detonator to detonators among the plurality of detonators, located adjacently to the first detonator, generate connection values for the plurality of detonators on the basis of the wireless network; compare the connection values and reference values for the plurality of detonators; and when the connection value for a single detonator among the plurality of detonators is greater than the reference value for the single detonator among the plurality of detonators, reset the wireless network.

The reference values may be previously set on the basis of performance of the plurality of detonators.

The blasting device may store the reference values in a blasting memory of the blasting device.

Advantageous Effects

As described above, the blasting system and the operating method thereof according to embodiments of the present invention can reduce communication load on the blasting device in wireless communication between the blasting device and the detonator.

In addition, the blasting system and the operating method thereof according to embodiments of the present invention can perform routing according to the detonators by setting the wireless network among the detonators.

The advantages obtainable from the present invention are not limited to the aforementioned advantages, and other advantages not explicitly disclosed herein will be clearly understood by those skilled in the art to which the present invention pertains from the description provided hereinafter.

DESCRIPTION OF DRAWINGS

FIG. 12 is a diagram illustrating the step of setting the wireless network according to an embodiment of the present invention.

DESCRIPTION OF THE REFERENCE NUMERALS IN THE DRAWINGS

Figure 1:
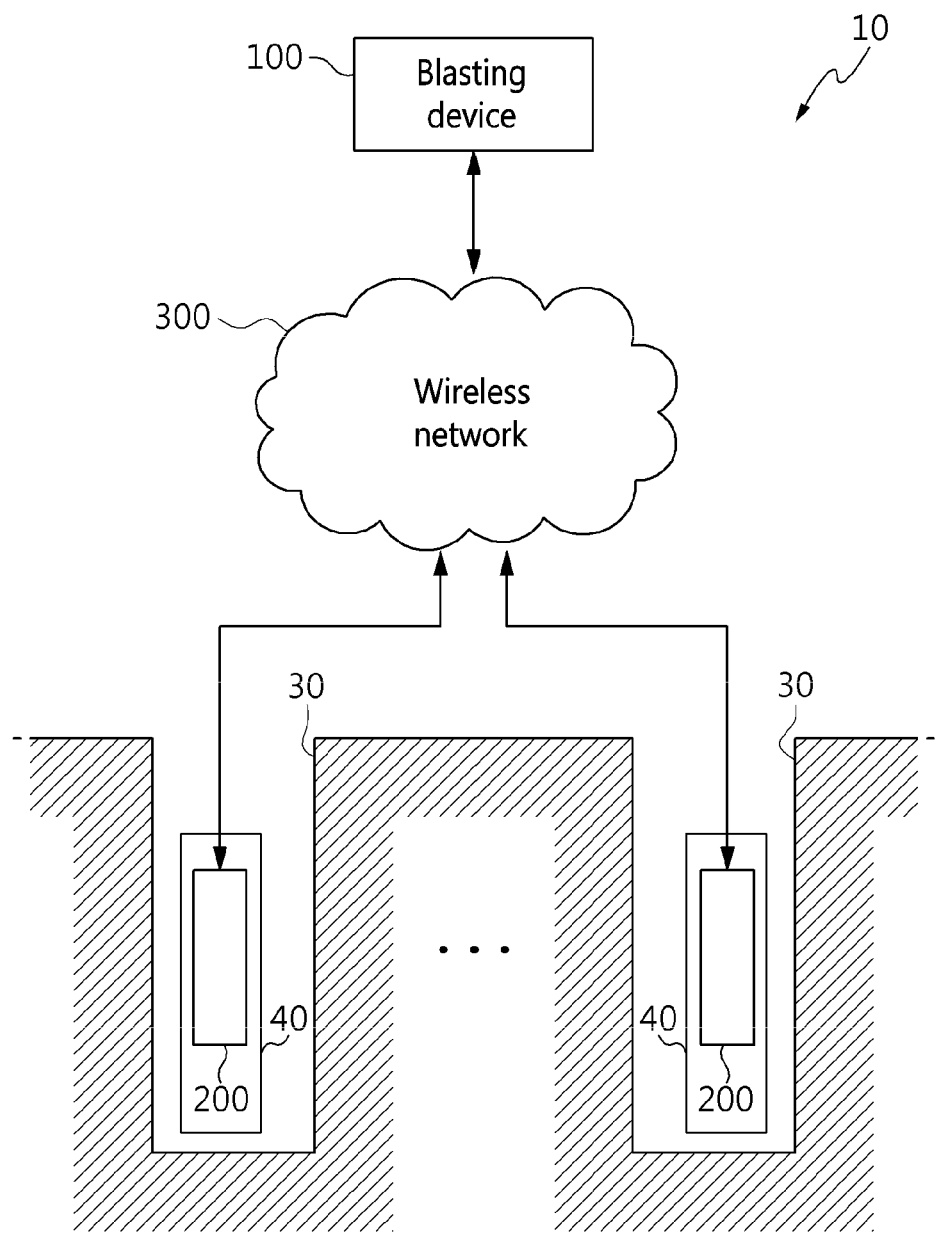
FIG. 1 is a conceptual view illustrating a blasting system 10 according to an embodiment of the present invention.

| 10: blasting system | 20: blasting target |
|---|---|
| 30: blasting hole | 40: explosive |
| 100: blasting device | 110: blasting controller |
| 120: blasting memory | 130: blasting GPS |
| 140: blasting communication part | |
| 200: detonator | |
| 210: detonator controller | |
| 220: detonator memory | |
| 230: detonator GPS part | |
| 240: detonator communication part | |

BEST MODE

Hereinafter, embodiments of the present invention and matters necessary for those skilled in the art to readily understand the features of the present invention will be described in detail with reference to the accompanying drawings. These embodiments are only provided for illustrative purposes, since the present invention may be implemented in a variety of different forms without departing from the scope of the present invention defined by the claims.

In the drawings, the same components will be designated by the same reference numerals. In addition, the thicknesses, ratios, and sizes of the components may be exaggerated for effective descriptions of technical features. The expression "and/or" includes any one or any combination of the mentioned items.

Terms such as "first" and "second" may be used herein to describe a variety of elements, and the elements should not be limited by the terms. The terms are only used to distinguish one element from other elements. Thus, a first element may be referred to as a second element, and similarly, a second element may be referred to as a first element. Singular forms used herein are intended to mean "one or more" unless the context clearly indicates otherwise.

Terms, such as "below", "beneath", "under", "lower", "above", and "upper", may be used herein for ease of description of the relationship of an element to other elements as illustrated in the drawings. Such terms should be construed as describing relative relationships, and are used with respect to the orientations depicted in the drawings.

It will be further understood that the terms "comprise", "include", "have", etc. when used in this specification, specify the presence of stated features, integers, steps, operations, components, parts, and/or combinations thereof, but do not preclude the presence or addition of one or more other features, integers, steps, operations, components, parts, and/or combinations thereof.

That is, the present disclosure is not limited to the embodiments disclosed below, and may be realized in various other forms. It will be understood that when an element is referred to as being "connected" to another element, not only can it be directly connected to the other element, but it can also be electrically connected to the other element via an intervening element. In designating elements of the drawings by reference numerals, the same elements will be designated by the same reference numerals even when they are shown in different drawings.

Figure 2:
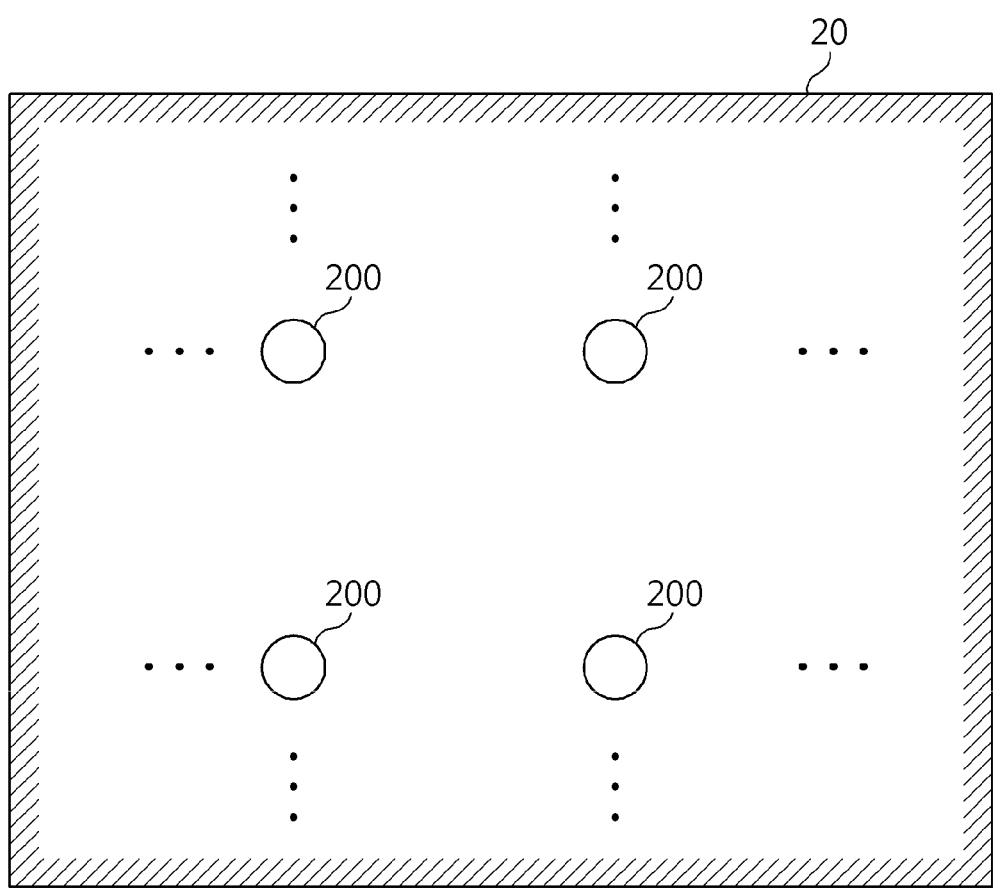
FIG. 2 is a diagram illustrating the blasting system 10 according to an embodiment of the present invention.

FIG. 1 is a conceptual view illustrating a blasting system 10 according to an embodiment of the present invention. FIG. 2 is a diagram illustrating the blasting system 10 according to an embodiment of the present invention. In FIG. 1, the cross-sections of detonators 200 and a blasting target 20 are illustrated to schematically illustrate the blasting system 10. In FIG. 2, the arrangement of the detonators 200 is viewed on the plane of the blasting target 20.

Referring to FIGS. 1 and 2, the blasting system 10 may include a blasting device 100, the detonators 200, and a wireless network 300.

Blasting operators may form blasting holes 30 by perforating a blasting target 20 in order to explode the blasting target 20. Blasting operators may insert explosives 40 into the blasting holes 30, with the explosives 40 having the detonators 200 attached thereto, respectively. As illustrated in FIG. 2, the detonators 200 may be arranged in the blasting target 20, in the shape of a lattice or a matrix.

A blasting operator may power on the detonators 200. When the detonators 200 are powered on, the detonators 200 may perform communications with the blasting device 100 via the wireless network 300. That is, the detonators 200 may be wirelessly connected to the blasting device 100 while repeatedly communicating with the blasting device 100. Here, the detonators 200 may be programmed in accordance with pre-designed values, and may transmit detonator information to the blasting device 100. For example, the detonator information may include a detonator identifier, position information, a detonator type, detonator performance, and the like.

The blasting device 100 may receive the detonator information via the wireless network 300 and store the received detonator information. The blasting device 100 may set delay times of the detonators 200 (i.e. detonator initialization times) on the basis of the detonator information.

The operator may generate a blasting command by operating the blasting device 100 in order to start blasting. In addition, the blasting device 100 may transmit the blasting command including a delay time to the detonators 200 via the wireless network 300. The detonators 200 may receive the blasting command transmitted by the blasting device 100.

The blasting command may include the delay time for the detonator 200. The detonators 200 may start counting the delay time. When the counting of the preset delay time is completed, the detonators 200 may detonate the explosives 40 connected thereto. Accordingly, the blasting device 100 may explode the blasting target 20 by detonating the plurality of explosives 40.

In some embodiments, the wireless network 300 may be implemented as any type of wireless network, such as a mobile radio communication network based on long-term evolution (LTE), a Bluetooth network, a Bluetooth low energy (BLE) network, a Zigbee® network, a Thread network, a Wi-Fi network, a wireless broadband (Wibro) network, and a long range (LoRa) network.

Figure 3:
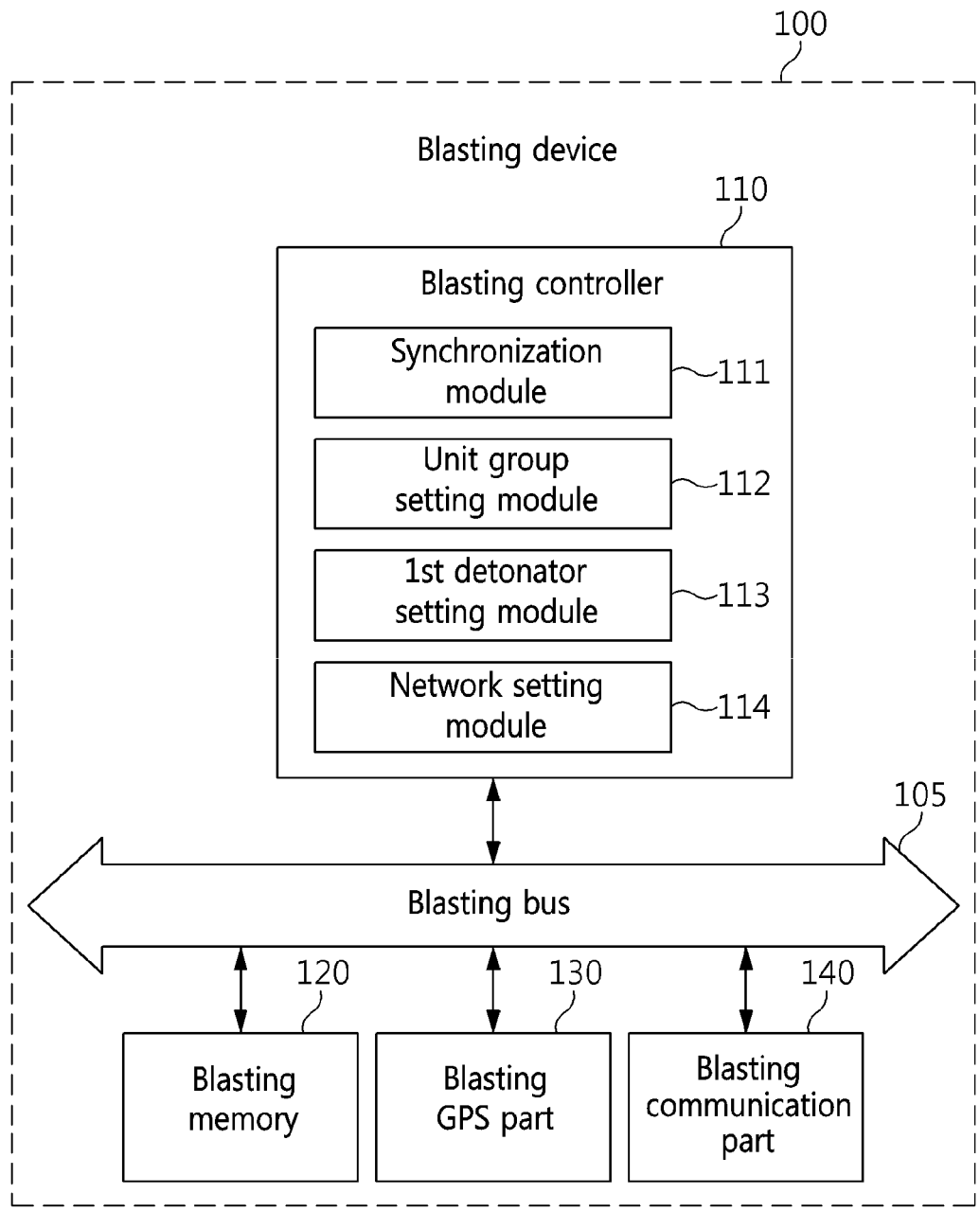
FIG. 3 is a diagram illustrating the blasting device 100 according to an embodiment of the present invention.

FIG. 3 is a diagram illustrating the blasting device 100 according to an embodiment of the present invention. Referring to FIG. 3, the blasting device 100 includes a blasting bus 105, a blasting controller 110, a blasting memory 120, a blasting global positioning system (GPS) part 130, and a blasting communication part 140.

The blasting bus 105 may allow data to be transmitted among the blasting controller 110, the blasting memory 120, the blasting GPS part 130, and the blasting communication part 140. In some embodiments, the blasting bus 105 may be implemented as a bus interface.

The blasting controller 110 may control the overall operation of the blasting device 100. In some embodiments, the blasting controller 110 may be implemented as a central processing unit (CPU), a microprocessor unit (MPU), a graphics processing unit (GPU), a microcontroller unit (MCU), or the like.

The blasting memory 120 may store, therein, a plurality of commands of a program executable by the blasting controller 110, data regarding a list of parts, data regarding characteristics of parts. In addition, the blasting memory 120 may store, therein, the delay times (i.e. ignition initialization times) for the detonators 200 and reference values. Here, the respective reference values may be a maximum connecting value previously set on the basis of at least one of the performance and type of a detonator 200 corresponding thereto. In some embodiments, the blasting memory 120 may be implemented as a read only memory (ROM), a random access memory (RAM), a hard disk drive (HDD), a solid state drive (SSD), or the like.

The blasting GPS part 130 may count an absolute time corresponding to the position (i.e. coordinates) of the blasting device 100. In some embodiments, the blasting GPS part 130 may include a GPS device able to accurately measure a point in time regarding a current position by receiving signals transmitted by GPS satellites and to count the absolute time. Here, the absolute time may be a reference time of the GPS time system.

The blasting communication part 140 may perform communications with the detonators 200 (see FIG. 1). For example, the blasting communication part 140 may perform communications with the detonators 200 via a wireless network (e.g. the wireless network 300 in FIG. 1).

The blasting controller 110 may include a synchronization module 111, a unit group setting module 112, a first detonator setting module 113, and a network setting module 114. Here, the term "module" may be software (or a program) in which commands constituting a program stored in the blasting memory 120 are executed by the controller 110.

The synchronization module 111 may perform synchronization of the blasting device 100 and the detonators 200. That is, the synchronization module 111 may synchronize the absolute time of a detonator GPS part 230 with the absolute time of the blasting GPS part 130. For example, the synchronization module 111 may transmit information regarding the absolute time of the blasting GPS part 130 to the detonators 200 via the blasting communication part 140.

The unit group setting module 112 may set a unit group UG including a plurality of detonators 200. That is, the unit group setting module 112 may set the unit group UG including the plurality of detonators 200 corresponding to some of the detonators 200 disposed in the blasting target.

The first detonator setting module 113 may set one detonator among the plurality of detonators 200 of the unit group UG as a first detonator. In some embodiments, the first detonator setting module 113 may set one detonator among the plurality of detonators 200, located closest to the blasting device 100 or located in the center, as the first detonator.

The network setting module 114 may set a wireless network on the basis of the first detonator. That is, the network setting module 114 may set a wireless network on the basis of the detonator 200 set as the first detonator by forming a network such that a plurality of pother detonators 200 are connected to the first detonator in relay.

Figure 4:
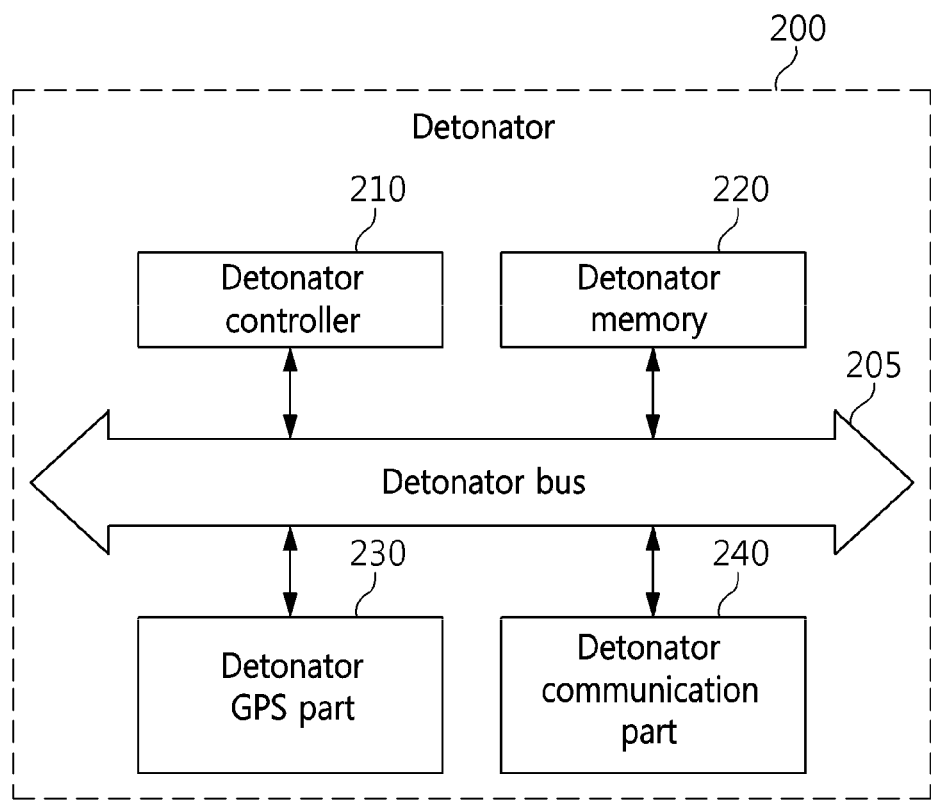
FIG. 4 is a diagram illustrating the detonator 200 according to an embodiment of the present invention.

FIG. 4 is a diagram illustrating the detonator 200 according to an embodiment of the present invention. The detonator 200 may include a detonator bus 205, a detonator controller 210, a detonator memory 220, a detonator GPS part 230, and a detonator communication part 240.

The detonator bus 205 may perform data communications among the detonator controller 210, the detonator memory 220, the detonator GPS part 230, and the detonator communication part 240. In some embodiments, detonator bus 205 may be implemented as a bus interface.

The detonator controller 210 may control the overall operation of the detonator 200. In some embodiments, the detonator controller 210 may be implemented as a central processing unit (CPU), a microprocessor unit (MPU), a graphics processing unit (GPU), a microcontroller unit (MCU), or the like.

The detonator memory 220 may store, therein, a plurality of commands of a program executable by the detonator controller 210, data regarding a list of parts, data regarding characteristics of parts. In addition, the detonator memory 220 may store, therein, the delay time (i.e. ignition initialization times) for the detonator 200. In some embodiments, the detonator memory 220 may be implemented as a read only memory (ROM), a random access memory (RAM), a hard disk drive (HDD), a solid state drive (SSD), or the like.

The detonator GPS part 230 may count a delay time corresponding to the detonator 200 on the basis of the absolute time. In some embodiments, the detonator GPS part 230 may include a GPS device able to accurately measure a point in time regarding a current position by receiving signals transmitted by GPS satellites and to count the delay time on the basis of the absolute time. Here, the absolute time may be a reference time of the GPS time system, used to count the delay time.

The detonator communication part 240 may perform communications with the blasting device 100 (see FIG. 1). For example, the detonator communication part 240 may perform communications with the blasting device 100 via the wireless network.

The detonator controller 210 may receive the blasting command via the detonator communication part 240. When the blasting command is received, the detonator controller 210 may count the ignition initialization time, included in the blasting command, via the detonator GPS part 230. When the counting of the ignition initialization time is completed, the detonator controller 210 may ignite the explosive 40 illustrated in FIG. 1.

Figure 5:
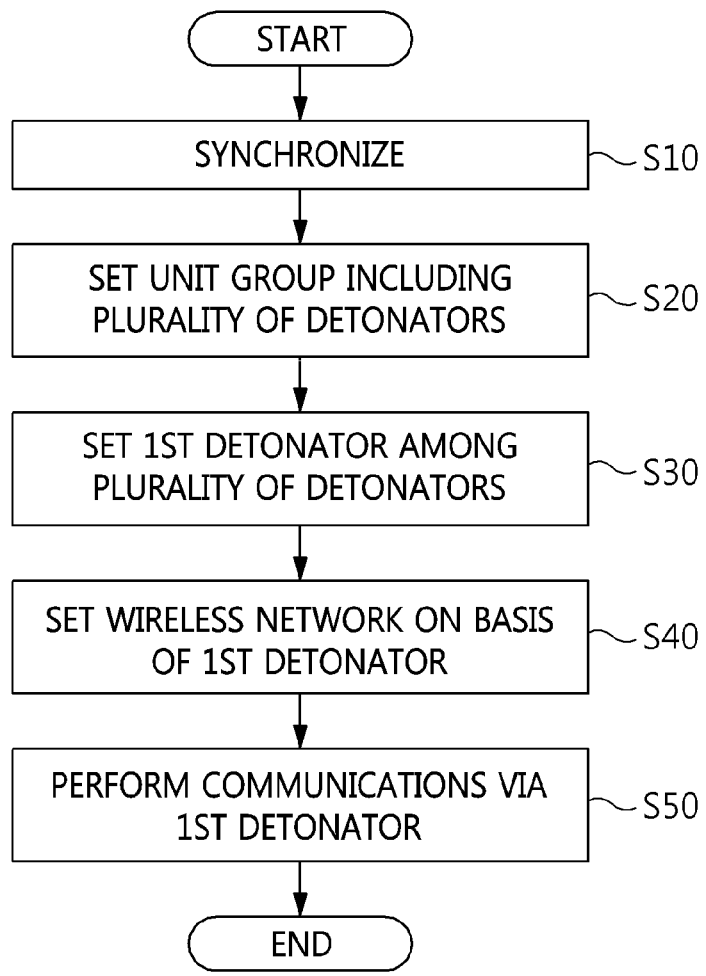
FIG. 5 is a flowchart illustrating a method of operating the blasting system according to an embodiment of the present invention.
Figure 6:
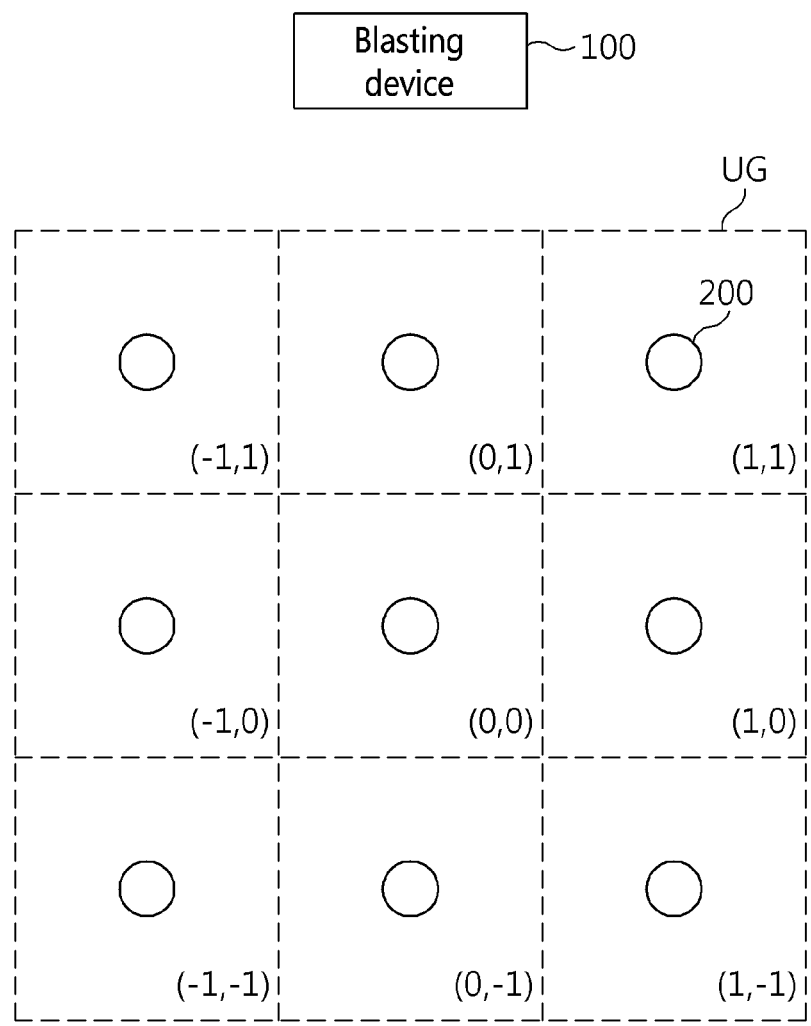
FIG. 6 is a diagram illustrating the method of operating the blasting system according to an embodiment of the present invention.
Figure 7:
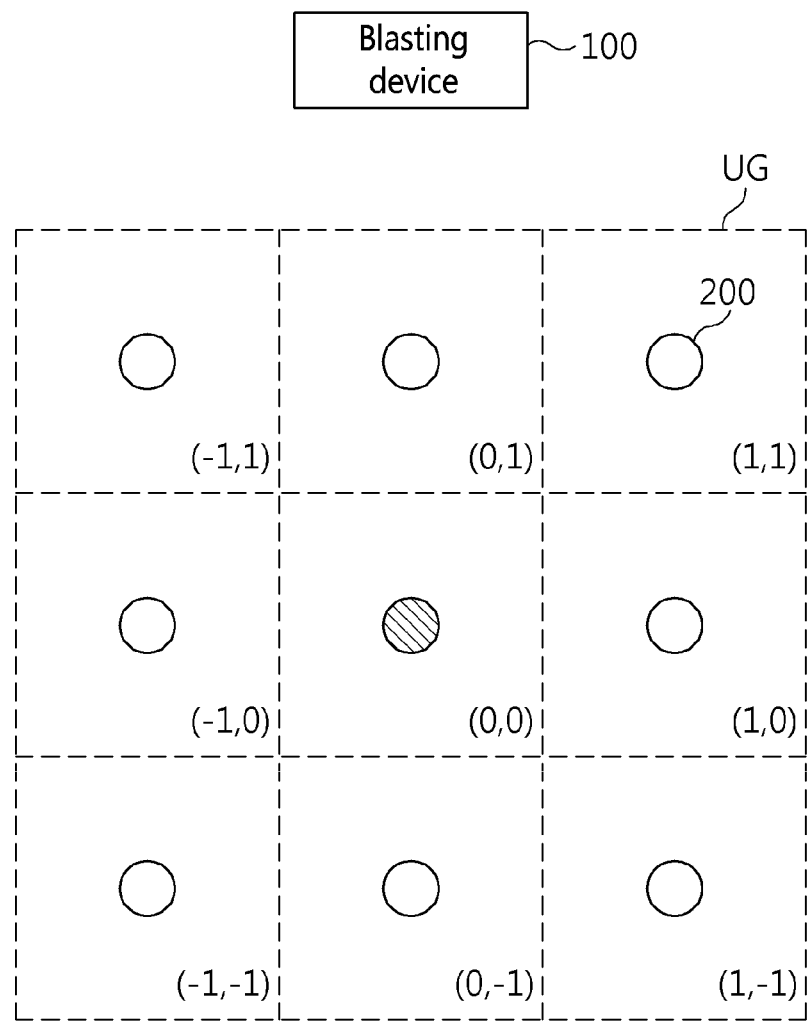
FIG. 7 is a diagram illustrating the method of operating the blasting system according to an embodiment of the present invention.
Figure 8:
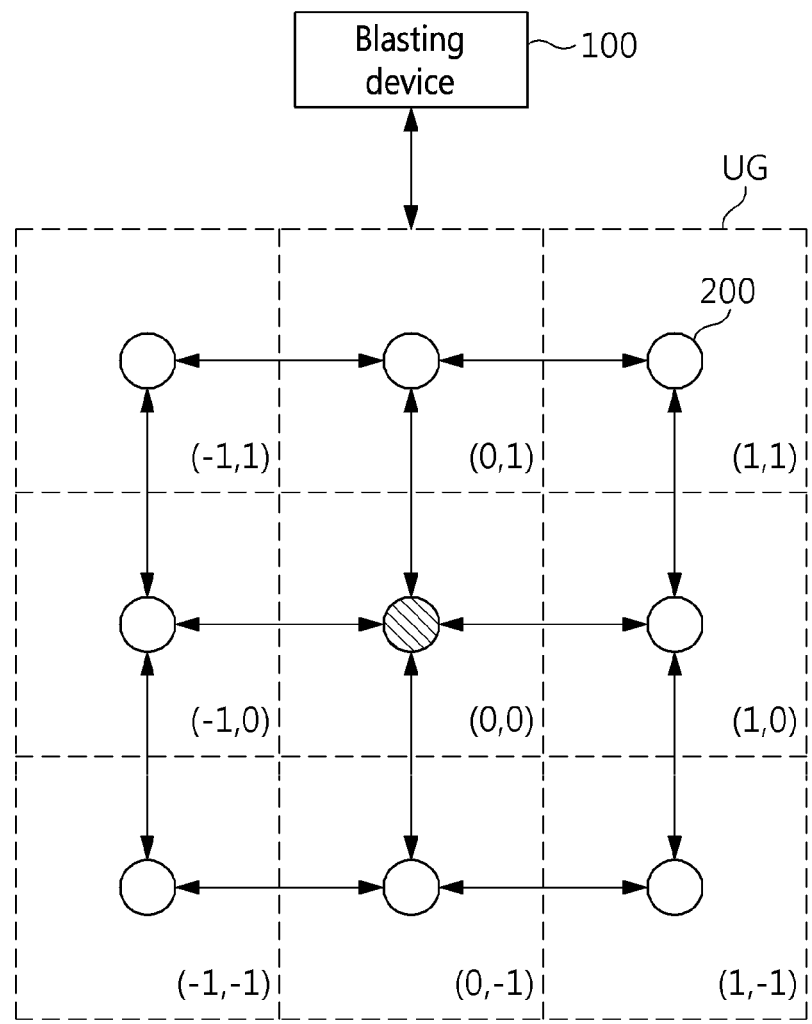
FIG. 8 is a diagram illustrating the method of operating the blasting system according to an embodiment of the present invention.

FIG. 5 is a flowchart illustrating a method of operating the blasting system according to an embodiment of the present invention. FIG. 6 is a diagram illustrating the method of operating the blasting system according to an embodiment of the present invention. FIG. 7 is a diagram illustrating the method of operating the blasting system according to an embodiment of the present invention. FIG. 8 is a diagram illustrating the method of operating the blasting system according to an embodiment of the present invention. Specifically, FIG. 6 illustrates step S20 of setting the unit group UG illustrated in FIG. 5, FIG. 7 illustrates step S30 of setting the first detonator illustrated in FIG. 5, and FIG. 8 illustrated step S40 of setting the wireless network illustrated in FIG. 5.

Referring to FIGS. 1 to 8, in step S10, the blasting device 100 and the detonators 200 of the blasting system 10 may perform synchronization. That is, the detonator 200 may synchronize the absolute time of the detonator GPS part 230 with the absolute time of the blasting GPS part 130. Here, the absolute time may be a reference time of the GPS time system, used to count the delay time.

In step S20, the blasting device 100 may set a unit group UG including a plurality of detonators 200. That is, as illustrated in FIG. 6, the blasting device 100 may set the unit group UG including the plurality of detonators 200 corresponding to some of the detonators 200 disposed in the blasting target 20. For example, the plurality of detonators 200 included in the unit group UG may be disposed adjacently to each other. The plurality of detonators 200 included in the unit group UG are illustrated as being nine (9) detonators 200 in FIGS. 6 to 8, but the present invention is not limited thereto. In some embodiments, the number of the plurality of detonators 200 included in the unit group UG may be set variously. For the sake of brevity, coordinates are added to each of the plurality of detonators 200 in FIGS. 6 to 8.

In step S30, the blasting device 100 may set the first detonator among the plurality of detonators 200. That is, the blasting device 100 may set the first detonator among the plurality of detonators 200 included in the unit group UG. In FIGS. 7 and 8, the first detonator is indicated with a hatched pattern.

According to the embodiment illustrated in FIG. 6, the blasting device 100 may set the detonator 200 among the plurality of detonators 200, located in the center, as the first detonator. That is, the blasting device 100 may set the detonator 200 having (0, 0) coordinates, among the plurality of detonators 200, as the first detonator. In addition, according to another embodiment, the blasting device 100 may set the detonator among the plurality of detonators 200, closest to the blasting device 100, as the first detonator. That is, the blasting device 100 may set the detonator 200 having (0, 1) coordinates, among the plurality of detonators 200, as the first detonator.

The first detonator may directly perform communications with the blasting device 100, and may bridge between the other detonators 200 and the blasting device 100. Here, the first detonator may be referred as a router detonator.

In step S40, the blasting device 100 may set a wireless network (e.g. a mesh network) on the basis of the first detonator. That is, the blasting device 100 may set the wireless network on the basis of the detonator 200 set as the first detonator by forming a network such that the other detonators 200 are connected to the first detonator in relay.

According to the embodiment illustrated in FIG. 8, the detonator 200 having (0, 0) coordinates is connected to the detonators 200 having (−1, 0), (0, −1), and (1, 0) coordinates. The detonator 200 having (0, 1) coordinates is connected to the detonators 200 having (−1, 1) and (1, 1) coordinates. The detonator 200 having (−1, 0) coordinates is connected to the detonators 200 having (−1, 1) and (−1, −1) coordinates. The detonator 200 having (0, −1) coordinates is connected to the detonators 200 having (−1, −1) and (1, −1) coordinates. The detonator 200 having (1, 0) coordinates is connected to the detonators 200 having (1, −1) coordinates.

In step S50, the blasting device 100 may perform communications with the plurality of detonators 200 of the unit group UG via the first detonator. That is, when the blasting device 100 performs communications with the detonators 200 included in the unit group UG, the blasting device 100 may perform communications with the first detonator, i.e. the detonator 200 having (0, 0) coordinates, and the first detonator may bridge between the other detonators 200 and the blasting device 100. For example, the blasting device 100 may transmit the blasting command including the delay times for the detonators 200 to the detonators 200 of the unit group UG via the first detonator.

Figure 9:
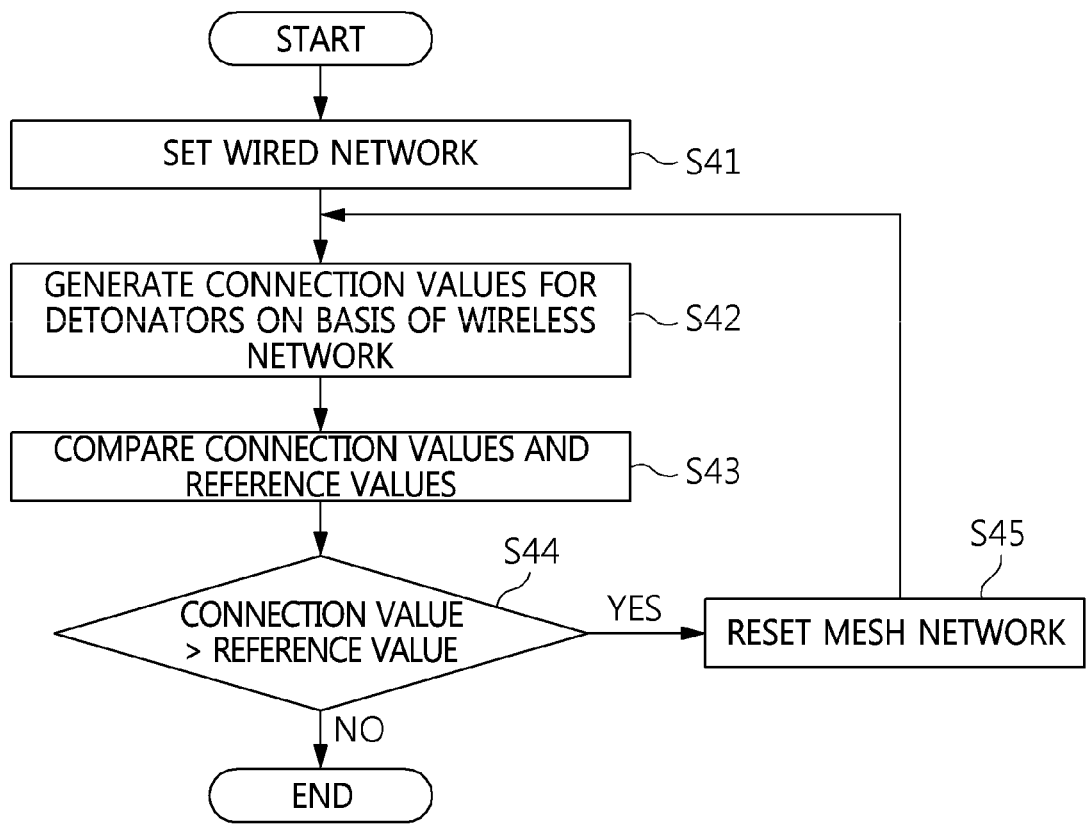
FIG. 9 is a flowchart specifically illustrating the step of setting the wireless network according to an embodiment of the present invention.
Figures 10, 11:
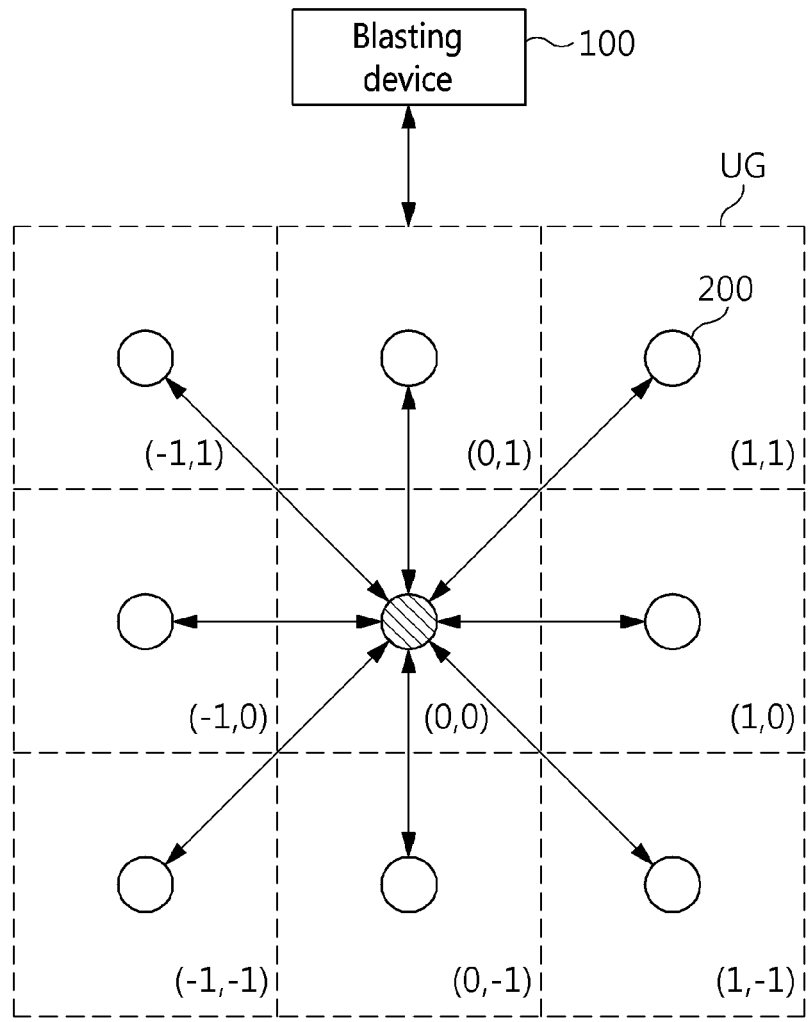
FIG. 10 is a diagram illustrating the step of setting the wireless network according to an embodiment of the present invention.
FIG. 11 is a diagram illustrating the step of setting the wireless network according to an embodiment of the present invention.

FIG. 9 is a flowchart specifically illustrating the step of setting the wireless network according to an embodiment of the present invention. FIG. 10 is a diagram illustrating the step of setting the wireless network according to an embodiment of the present invention. FIG. 11 is a diagram illustrating the step of setting the wireless network according to an embodiment of the present invention. FIG. 12 is a diagram illustrating the step of setting the wireless network according to an embodiment of the present invention.

Referring to FIGS. 1 to 12, the step S40 of setting the wireless network may include: step S41 of setting the wireless network by connecting the first detonator and the detonators 200 close to the first detonator; step S42 of generating connection values for the plurality of detonators on the basis of the wireless network; step S43 of comparing the connection values and reference values for the plurality of detonators 200; and step S45 of resetting the wireless network when the connection value of one detonator among the plurality of detonators 200 is greater than the reference value of the detonator.

In step S41, the blasting device 100 may set the wireless network by connecting the first detonator and the detonators 200 close to the first detonator. That is, the blasting device 100 may set the wireless network as in the embodiments illustrated in FIGS. 8 and 10. Hereinafter, the wireless network will be described as being set by the blasting device 100 according to the embodiment illustrated in FIG. 10.

That is, according to the embodiment illustrated in FIG. 10, the detonator 200 having (0, 0) coordinates may be connected to the detonators 200 having (−1, 1) coordinates, (0, 1) coordinates, (1, 1) coordinates, (−1, 0) coordinates, (1, 0) coordinates, (−1, −1) coordinates, (0, −1) coordinates, and (1, −1) coordinates.

In step S42, the blasting device 100 may set the connection values for the detonators 200 on the basis of the wireless network. Here, the connection values may be the number of the detonators connected to the corresponding detonator 200. On the basis of the wireless network illustrated in FIG. 10, the blasting device 100 may generate the connection values corresponding to the detonators 200, respectively, as illustrated in FIG. 11.

In step S43, the blasting device 100 may compare the connection values and the reference values for the plurality of detonators 200. That is, the blasting device 100 may compare the coordinate-specific reference values of the respective detonators 200 illustrated in FIG. 10 with the coordinate-specific reference values of the respective detonators 200 illustrated in FIG. 11. Here, the reference value may be the maximum connection value previously set on the basis of at least one of the performance and type of the corresponding detonator 200. The higher the performance of the detonator 200 is, the greater the reference value may be. For example, the reference values may be stored in the blasting memory 120.

When the connection value of one detonator among the plurality of detonators 200 is greater than the reference value (YES in step S44), the blasting device 100 may reset the wireless network in step S45. That is, since the connection value corresponding to the detonator 200 having (0, 0) coordinates is 8 and the reference value is 4, the blasting device 100 may reset the wireless network. For example, the blasting device 100 may reset the wireless network according to the embodiment illustrated in FIG. 8. Afterwards, the blasting device 100 may perform the step S42 of generating the connection values of the plurality of detonators.

As set forth above, the blasting system and the operating method thereof according to embodiments of the present invention can reduce communication load on the blasting device in wireless communication between the blasting device and the detonator.

In addition, the blasting system and the operating method thereof according to embodiments of the present invention can perform routing according to the detonators by setting the wireless network among the detonators.

Although the exemplary embodiments of the present invention have been described for illustrative purposes, those skilled in the art or those having ordinary knowledge in the art will appreciate that various modifications, additions and substitutions are possible without departing from the scope and spirit of the present invention as disclosed in the accompanying claims.

Therefore, the technical scope of the present invention is not limited to the exemplary embodiments described herein, but should be determined on the basis of the claims.

The invention claimed is:

1. A method of operating a blasting system, the method comprising:
   synchronizing a blasting device with a detonator;
   setting a unit group including a plurality of the detonators;
   setting a first detonator among the plurality of detonators of the unit group;
   setting a wireless network generated from the first detonator; and
   performing, by the blasting device, communications with the plurality of detonators of the unit group via the first detonator,
   wherein the setting of the first detonator sets a detonator among the plurality of detonators of the unit group, located in a center, as the first detonator,
   wherein the blasting device transmits a blasting command including delay times to the first detonator, and the first detonator transmits the blasting command including the delay times to the plurality of detonators of the unit group,
   wherein the setting of the wireless network comprises:
      setting the wireless network by connecting the first detonator to detonators among the plurality of detonators, located adjacently to the first detonator;
      generating connection values for the plurality of detonators through the wireless network;
      comparing the connection values and reference values for the plurality of detonators; and
      when the connection value for a single detonator among the plurality of detonators is greater than the reference value for the single detonator among the plurality of detonators, resetting the wireless network, and
   wherein the connection value for the single detonator is a number of the detonators among the plurality of detonators connected to the single detonator.

2. The method according to claim 1, wherein the synchronization synchronizes an absolute time of the blasting device and an absolute time of each detonator among the plurality of detonators.

3. The method according to claim 1, wherein the reference values are predetermined values in accordance with performance of the plurality of detonators.

4. The method according to claim 3, wherein the blasting device stores the reference values in a blasting memory of the blasting device.

5. A blasting system comprising:
   a detonator disposed in a blasting hole of a blasting target; and
   a blasting device transmitting a blasting command to the detonator via a wireless network,
   wherein the blasting device includes:
   a synchronization module performing synchronization with the detonator;
   a unit group setting module setting a unit group including a plurality of the detonators;
   a first detonator setting module setting a first detonator among the plurality of detonators of the unit group; and
   a network setting module setting the wireless network generated from the first detonator,
   wherein the first detonator is located in a center of the plurality of detonators of the unit group,
   wherein the blasting device communicates with the plurality of detonators of the unit group via the first detonator,
   wherein the blasting device transmits the blasting command including delay times to the first detonator, and the first detonator transmits the blasting command including the delay times to the plurality of detonators of the unit group,
   wherein the network setting module
      sets the wireless network by connecting the first detonator to detonators among the plurality of detonators, located adjacently to the first detonator,
      generates connection values for the plurality of detonators through the wireless network;

compares the connection values and reference values for the plurality of detonators; and when the connection value for a single detonator among the plurality of detonators is greater than the reference value for the single detonator among the plurality of detonators, resets the wireless network, and wherein the connection value for the single detonator is a number of the detonators among the plurality of detonators connected to the single detonator.

6. The blasting system according to claim 5, wherein the blasting device includes a blasting communication part performing communications with the plurality of detonators of the unit group via the first detonator.

7. The blasting system according to claim 6, wherein the synchronization module synchronizes an absolute time of the blasting device and an absolute time of each detonator among the plurality of detonators.

8. The blasting system according to claim 5, wherein the reference values are predetermined values in accordance with performance of the plurality of detonators.

9. The blasting system according to claim 8, wherein the blasting device stores the reference values in a blasting memory of the blasting device.

* * * * *